Patented June 5, 1945

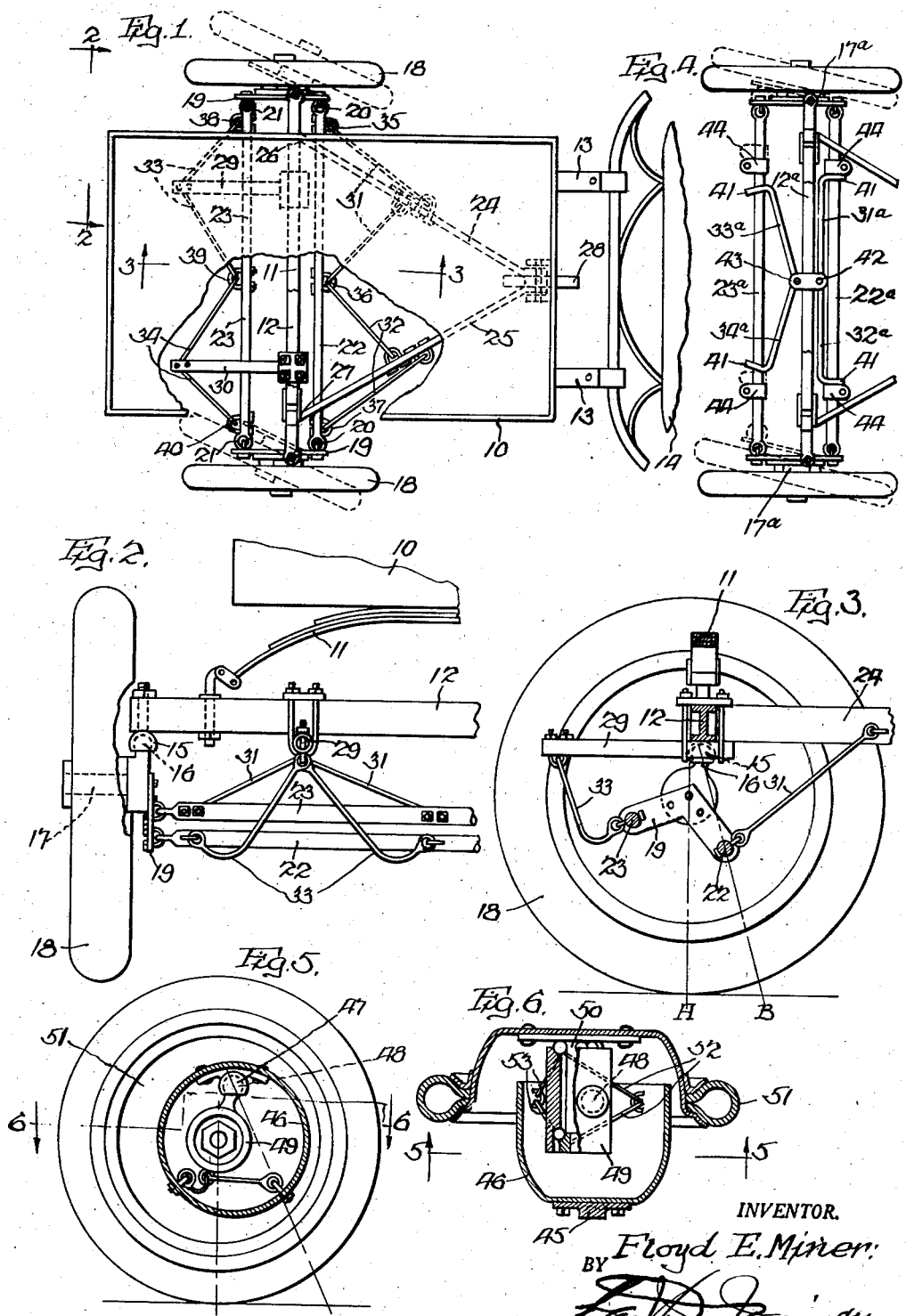

2,377,641

UNITED STATES PATENT OFFICE 2,377,641

TRAILER WHEEL SUPPORT AND GUIDING MEANS

Floyd E. Miner, Chicago, Ill.

Application November 22, 1943, Serial No. 511,209

4 Claims. (Cl. 280—33.4)

This invention relates to support and guiding means for trailer wheels and is an improvement of my "Trailer wheel supporting means," filed September 10, 1942, Serial No. 457,819, now Patent #2,345,945 issued April 4, 1944.

The present invention is more particularly directed to means for connecting trailer wheels together to simultaneously guide them during their turning movements upon the movement of the trailer and to properly align them with the wheels of the car to which the trailer is attached.

It is therefore, an object of the present invention to accomplish the above features whereby the two wheels of the trailer will automatically adjust themselves simultaneously in accordance with the direction of movement of the car to which the trailer is attached.

A further object is the provision of a combination swingable and pivotal wheel spindle on each end of the axle and with transverse means connecting the spindles for simultaneous movements.

And a further object is the provision of guide means associated with the transverse means for limiting the swingable and pivotal movements of the spindles for proper alignment of the caster of the wheels in the direction the trailer is being moved.

A still further object is the provision of a swingable and pivotal wheel spindle on each end of the axle with means associated with the wheels spindles for connecting them together and for guiding and limiting their swinging and pivotal movements to align the wheels in accordance to the direction of movement of the car to which the trailer is attached.

Other and further objects and advantages will become apparent from the ensuing description and claims.

Referring to the drawing:

Figure 1 is a top plan view of a trailer embodying my invention and with a portion of the trailer body broken away to show the operative parts, and with the trailer as attached to the rear bumper of a car.

Figure 2 is an enlarged partial detail rear elevation substantially on the line 2—2 of Fig. 1.

Figure 3 is an enlarged detail sectional view taken substantially on the line 3—3 of Fig. 1.

Figure 4 is a partial plan view of a modified form of guide means operable by the transverse means.

Figure 5 is a sectional view of a modified form of spindle support taken on the line 5—5 of Fig. 6.

Figure 6 is a sectional view taken substantially on the line 6—6 of Fig. 5.

The trailer is illustrated as having a body 10 which is supported on a transverse spring 11 carried on the axle 12. The forward end of the trailer body 10 is provided with a pair of arms 13—13 for attachment to a car 14.

The axle 12 is provided at each of its ends with a socket 15 into which socket a ball 16 of a spindle 17 is journaled. The ball 16 is arranged to be positioned above the axial line of the spindle to permit the spindle to be rocked in accordance with the rotating movements of the wheel 18 carried thereon. The construction permits of a wobble movement of the wheel, and as both wheels of the trailer are arranged in a like manner, it is the means to connect and guide the wheels simultaneously that this invention appertains.

Each spindle 17 has fixed on its inner side an L-shaped plate 19 and to each leg of which is pivotally connected at 20—20 and 21—21 a tie-rod or connecting means 22 and 23, respectively. These tie-rods or connecting means 22 and 23 are arranged an appreciable distance apart on the spindles and below their axial line and serve to connect and guide the spindles 17 in their turning movements on a substantially horizontal plane in the sockets 15 while permitting of a free forward and backward rocking movement of the spindles. The free forward and backward rocking movements of the spindles is affected by the rotating movements of the wheels 18 in accordance to the direction in which the trailer is being moved. This forward and rearward rocking movement of the spindles positions them to the proper angle of caster and in order to limit the caster of the spindles in either direction, a guiding means is provided, as will be presently described.

A pair of arms 24 and 25 is secured at 26—27 to the axle 12 and extends forwardly and converges to support a depending wheel 28 which is normally spaced an appreciable distance from the ground when the trailer is attached to a car, but which wheel serves to support the forward end of the trailer when it is disconnected from the car. The arms 24 and 25 and a rearwardly directed pair of arms 29 and 30 which are also secured to the axle 12 serve as means to which the spindle guiding means is secured. Attached to each of the arms 24—25 and 29—30 is a guide means such as a cable or chain 31—32 and 33—34, respectively, which are directed in the form of a V and attached to their respective tie-rods. The cables or chains 31 and 32 are attached to the forward tie-rod 22 at three positions 35, 36 and 37, while the cables or chains 30 and 31 are attached to the rearward tie-rod 23 at three positions 38, 39 and 40. During the rocking or caster movement of the spindles either the cables or chains 31 and 32 or the cables or chains 33 and 34 will limit the movement of the spindles to the proper caster depending upon the direction of movement of the trailer. When the trailer is pulled in a forward direction, the resistance of the wheels on the ground will cause the spindles to be rocked rearwardly and the cables or chains 31 and 32 will be drawn taut while the cables or chains 33 and 34 will be released. As the trailer is moved in a rearward direction, the spindles are rocked forwardly and the cables or chains 33 and 34 are drawn taut and the cables or chains 31 and 32 are released. These cables or chains serve as the guide means for limiting the forward and backward rocking movements of the spindles to the proper caster while permitting of a pivotal turning movement of the spindles.

This caster section of the spindles, when the trailer is moved forwardly, is illustrated in Fig. 3, in which the vertical line through the spindle is indicated as A, while the caster angle is indicated as B. When the trailer movement is reversed, the caster angle of the spindles is then rearwardly of the vertical line A.

Referring now to the modified form illustrated in Fig. 4, the axle 12a has spindles 17a wobbly arranged at each end thereof and the tie-rods 22a and 23a are connected to the spindles for effecting a simultaneous movement of the spindles on a substantially horizontal plane. This portion of the structure is the same as that shown in the preferred form Figs. 1, 2 and 3, the difference being in the guiding means for limiting the caster movement of the spindles. This guiding means comprises two pairs of links 31a—32a and 33a—34a pivotally secured forwardly and rearwardly of the axle 12a and centrally thereof. The free ends of the links are each provided with loop formations designated as 41 and these formations receive the tie-rods 22a and 23a, respectively, and permit of a free sliding movement of the tie-rods therethrough. The links are pivotally attached to the axle at 42 and 43 and these pivotal connections permit of a free rocking and pivotal movement of the links so that they will not hinder the free castering movements of the spindles. To limit the caster movement of the spindles, each tie-rod 22a—23a is provided with a clamp member designated as 44 adjustably attached to the tie-rods outwardly of the loops 41 of the links.

The clamp members 44 are positioned on the tie-rods so as to engage the loops of opposite ends of the links 31a—32a when the trailer is moved in a forwardly direction and at which time the tie-rod 23a will be moved rearwardly with the clamp members 44 thereon in spaced relation with the loops 41 of the links 33a—34a. When the trailer is moved rearwardly, the caster action is in the reverse direction and the clamp members 44 engage the loops 41 at opposite ends of the links 33a—34a while the clamp members 44 of the tie-rod 22a are moved in spaced relation with the loops 41 of the links 31a—32a.

While the caster angle is in the forward or rearward direction as pointed out in the description to Fig. 3, the trailer wheels are free to turn on their caster pivots the distance permitted by the space between the loops 41 of the links and the clamp members 44 of the tie-rods.

Referring more particularly to Figs. 5 and 6, a modified form of wheel support and guiding means is illustrated in which the trailer axle may be eliminated and the wheels supported directly to the body of the trailer or in instances where a single wheel for a trailer may be desirable. The bracket 45 is secured to the body of the trailer and a cup-shaped housing 46 is secured to the bracket 45. Depending centrally near the periphery of the cup-shaped housing 46 is a socket 47 into which a ball 48 is pivoted and from which ball depends an integral spindle bearing 49 into which the spindle 50 is pivoted and which spindle supports a dished wheel 51 which brings the tire tread aligned with the ball 48 pivoted in the socket 47. Diametrically below the ball 48 and secured to the spindle bearing 49 are cables or chains arranged in pairs and designated as 52 and 53. These cables or chains serve to limit the caster movement of the spindle 50 in either direction of turning movement of the wheel 51 in the same manner as the cables or chains in the preferred embodiment Figs. 1, 2 and 3.

In either of the forms shown, the caster of the spindles is limited by guiding means in either direction of movement of the trailer and in each instance the guiding means will permit of a free pivotal turning movement of the spindles effected by the road conditions and the direction in which the trailer is being moved about.

I claim:

1. In a trailer wheel support and guiding means, an axle, wheel spindles wobbly attached on the ends of the axle, wheels on the spindles, means connecting the spindles for simultaneous wobbly movements, supports on the axle extending forwardly and rearwardly thereof, guide means connecting said supports and spindle connecting means for guiding and limiting the wobble movements of said spindles, said guide means forming a caster pivot for the wheels at each limit of their movement.

2. In a trailer wheel support and guiding means, an axle, wheel spindles wobbly attached on the ends of the axle, wheels on the spindles, means connecting the spindles for simultaneous wobble movements, guiding means carried by the axle and connected to said connecting means for limiting the wobble movements of the spindles in two extreme limits of their wobble movements to provide a caster pivot for the wheels in either direction of their turning movements.

3. In a trailer wheel support and guiding means, an axle, wheel spindles pivoted at each end of the axle, wheels on the spindles, means connecting the spindles for simultaneous pivotal movements, guiding means carried on opposite sides of the axle and attached to said spindle connecting means for limiting their movements in two directions, said guiding means permitting of a free pivotal movement of the spindles between their two extreme limits of movement.

4. In a trailer wheel support and guiding means, an axle, wheel spindles wobbly pivoted at each end of the axle, wheels on the spindles, means connecting the spindles for simultaneous pivotal movements, guide means carried on each side of the axle and attached to said spindle connecting means for limiting the pivotal movements of the spindles in two directions of their pivotal movements, said guide means permitting of a wobble movement of the spindles between each limit of their pivotal movements.

FLOYD E. MINER.